(12) United States Patent
Chiang et al.

(10) Patent No.: US 10,457,347 B2
(45) Date of Patent: Oct. 29, 2019

(54) EMBEDDED HANDLE AND HANDLE STRUCTURE FOR BICYCLE

(71) Applicant: TH INDUSTRIES CO., LTD., Taichung (TW)

(72) Inventors: Douglas Chiang, Taichung (TW); Ron Correa, Taichung (TW)

(73) Assignee: TH INDUSTRIES CO., LTD., Taichung (TW)

(*) Notice: Subject to any disclaimer, the term of this patent is extended or adjusted under 35 U.S.C. 154(b) by 0 days.

(21) Appl. No.: 15/704,875

(22) Filed: Sep. 14, 2017

(65) Prior Publication Data
US 2018/0290705 A1   Oct. 11, 2018

(30) Foreign Application Priority Data

Apr. 10, 2017 (TW) .............................. 106204940 U
Jun. 19, 2017 (TW) .............................. 106208857 U

(51) Int. Cl.
*B62K 21/12*   (2006.01)
*B62K 3/00*    (2006.01)

(52) U.S. Cl.
CPC ................ *B62K 21/12* (2013.01); *B62K 3/00* (2013.01); *B62K 21/125* (2013.01)

(58) Field of Classification Search
CPC ........ B62K 21/12; B62K 21/16; B62K 21/18; B62K 21/22; B62K 11/14; Y10T 74/20792; Y10T 74/20804; Y10T 74/20798; Y10T 74/2078; Y10T 74/20822; G05G 5/005; G05G 5/06; G05G 5/028
See application file for complete search history.

(56) References Cited

U.S. PATENT DOCUMENTS 7,490,531 B2 * 2/2009 Chen .................... B62K 21/125
                                            74/551.1
9,415,825 B1 * 8/2016 Salazar ................. B62K 21/18
(Continued)

FOREIGN PATENT DOCUMENTS

JP          2008-215501   *  9/2008   .............. F16B 37/00

OTHER PUBLICATIONS

Machine Translation of JP 2008-215501, obtained Feb. 15, 2019.*

*Primary Examiner* — Richard W Ridley
*Assistant Examiner* — Brian J McGovern
(74) *Attorney, Agent, or Firm* — R. Lynette Wylie; Apex Juris, PLLC.

(57) ABSTRACT

An embedded handle and handle structure of the embedded handle for a bicycle are provided. The handle structure includes the embedded handle and a stem. The embedded handle includes two holding portions and a joining portion. The middle of the joining portion has a depression. The depression has a connecting portion, and the stem has an engaging portion. The handlebar further includes a handle mounting hole. And the engaging portion of the stem further includes a first mounting hole and a second mounting hole. When the engaging portion engages with the depression, the first mounting hole, the second mounting hole and the handle mounting hole are aligned. The first fastener is inserted into the aligned holes, and the second fastener is inserted into the aligned holes along a direction opposite to the first fastener and joined to the first fastener.

12 Claims, 8 Drawing Sheets

(56) References Cited

U.S. PATENT DOCUMENTS

| | | | | |
|---|---|---|---|---|
| 2004/0114099 A1* | 6/2004 | Shiokawa | ............... | G02C 1/02 |
| | | | | 351/121 |
| 2004/0183273 A1* | 9/2004 | French | ............... | B62K 21/18 |
| | | | | 280/280 |
| 2005/0000313 A1* | 1/2005 | Johnson | ............... | B62K 21/12 |
| | | | | 74/551.8 |
| 2005/0044981 A1* | 3/2005 | Huang | ............... | B62K 21/125 |
| | | | | 74/551.8 |
| 2005/0268743 A1* | 12/2005 | Meng | ............... | B62K 21/12 |
| | | | | 74/551.8 |
| 2007/0199401 A1* | 8/2007 | Kawakami | ............... | B62K 23/06 |
| | | | | 74/502.2 |
| 2010/0213684 A1* | 8/2010 | D'Aluisio | ............... | B60T 7/10 |
| | | | | 280/279 |
| 2012/0001402 A1* | 1/2012 | Weber | ............... | B62K 21/125 |
| | | | | 280/288.4 |
| 2012/0261896 A1* | 10/2012 | Callahan | ............... | B62K 3/04 |
| | | | | 280/282 |
| 2012/0297922 A1* | 11/2012 | Cote | ............... | B62K 21/125 |
| | | | | 74/551.3 |
| 2015/0151809 A1* | 6/2015 | Li | ............... | B62K 21/18 |
| | | | | 74/551.1 |

* cited by examiner

EMBEDDED HANDLE AND HANDLE STRUCTURE FOR BICYCLE

FIELD OF THE INVENTION

The present disclosure relates to an embedded handle and a handle structure of embedded handle for a bicycle, and more particularly to an aerodynamic embedded handle and a handle structure of the aerodynamic embedded handle for a bicycle.

BACKGROUND OF THE INVENTION

Exercise for being healthy is now a worldwide fashion. Riding bicycle is one of those popular exercises. Compare to other exercises, riding bicycle can not only keep the shape of our bodies, but also can broaden our horizons while traveling.

For various requirements, such as traffic, short trip, racing, long-term trip, ironman triathlon, the handles of bicycles also have various types to fit every requirement. In addition to general flat bars and drop handles, aero handlebars, extension handlebar or other handles of types and functions are also popular in recent years, that bicycle riders may enjoy the riding with various handles. Take aero handlebars for example.

Aero handlebars are frequently seen in riding activities, to firmly connect the aero handlebar and the stem, the aero handlebars have a predetermined thickness, the height of connecting base of stem and aero handlebar is also predetermined. And a front cover is used to cover the junction portion of the aero handlebar and the stem. Therefore, the total thickness of the handle structure including the aero handlebar, the base and the front cover is considerable.

Since the population of ironman triathlon is increased, it is important to develop a handlebar with high strength and low wind resistance so as to increase riding speed and reduce force.

SUMMARY OF THE INVENTION

The present disclosure provides an embedded handle and a handle structure for a bicycle. The handle structure has a stable structure and is an aero type handle structure which has low wind resistance. Furthermore, it is easy and quick to assemble the handle structure, and the handle structure of the present disclosure provides a graceful appearance and a modern sense.

The present disclosure relates to an embedded handle and a handle structure for a bicycle. The handle structure includes the embedded handle and a stem. The embedded handle is an integrally formed aero handlebar which includes two grip portions and a joining portion.

The grip portions are disposed on the right end and the left end of the embedded handle respectively. A joining portion is disposed in a middle portion of the embedded handle and connects the right end and the left end. A depression is formed in the joining portion, and the depression comprises a connecting portion. The stem includes an engaging portion. The engaging portion engages the depression so that the connecting portion is tightly fitted and engaged with the engaging portion to form a smooth surface having low wind resistance.

Since the engagement is accomplished by the depression, the handle structure become more stable and reliable, and the total thickness is thus reduced. A spoiler portion is disposed in a front edge of the embedded handle and opposite to the joining portion.

The connecting portion of the embedded handle includes a first connecting part, a second connecting part and a third connecting part. Each of the first connecting part, the second connecting part and the third connecting part has a through hole. The engaging portion of the stem includes a first engaging part, a second engaging part and a third engaging part, and each of the first engaging part, the second engaging part and the third engaging part has at least one screw hole. At least one bolt extends through the through hole of the third connecting part to screw into the screw hole of the third engaging part so that the third engaging part is tightly joined to the third connecting part.

In addition, each of the first engaging part and the second engaging part has a base. The handle structure further includes a spacer and at least one extension handlebar. The spacer is engaged with the base, and the extension handlebar is engaged with the base or the spacer, whereby the height of the extension handlebar is adjusted for riders of different body sizes and riding customs.

The present disclosure provides an embedded handle and a handle structure for a bicycle. The engagement structure of the engaging portion of the stem and the depression of the joining portion provides a firm and stable connection and an aero structure which has low wind resistance. Furthermore, the assembly of the handle structure is easy and quick. The handle structure of the present disclosure also has a graceful appearance and a modern sense. The manufacturing cost is reduced and the product value is raised.

The present disclosure also provides a fastening structure for the handle structure.

An embodiment of the fastening structure for the handle structure includes a first fastener and a second fastener, wherein the stem further comprises a first mounting portion having a first mounting hole and a second mounting portion having a second mounting hole; the embedded handle further comprises a handle mounting hole, wherein the handle is mounted between the first mounting portion and the second mounting portion to enable the first mounting hole, the second mounting hole and the handle mounting hole to be aligned, the first fastener is inserted into the aligned first mounting hole, second mounting hole or handle mounting hole via the first mounting portion or the second mounting portion, the second fastener is inserted into the aligned first mounting hole, second mounting hole or handle mounting hole in a direction opposite to the first fastener and fastened to the first fastener, wherein the handle mounting hole is formed by an inner peripheral wall whose diameter is gradually reduced from an outer surface of the embedded handle to an interior of the embedded handle, and at least a portion of the second fastener is fitted to the handle mounting hole through mated interfaces of an outer peripheral wall of the second fastener and the inner peripheral wall of the handle mounting hole.

Since the inner peripheral wall of the handle mounting hole is circular conical and the outer peripheral wall of the second fastener is also circular conical, the outer peripheral wall is fitted to the inner peripheral wall when the first fastener is fastened to the second fastener. Therefore, the handle structure has a larger lateral fastening strength and can sustain a larger shear stress so as to avoid damage of the first fastener and the second fastener due to shear stress caused by structural compression. The second fastener provides a larger engaging area so as to increase stability of the whole structure. Since the inner peripheral wall of the handle mounting hole is conical, the opening of the handle mounting hole has a larger diameter and the second fastener is easily inserted into the handle mounting hole so as to simplify manufacturing process and reduce manufacturing cost.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of present disclosure are presented herein for purpose of illustration and description only. It is not intended to be exhaustive or to be limited to the precise form disclosed.

Figure 1:
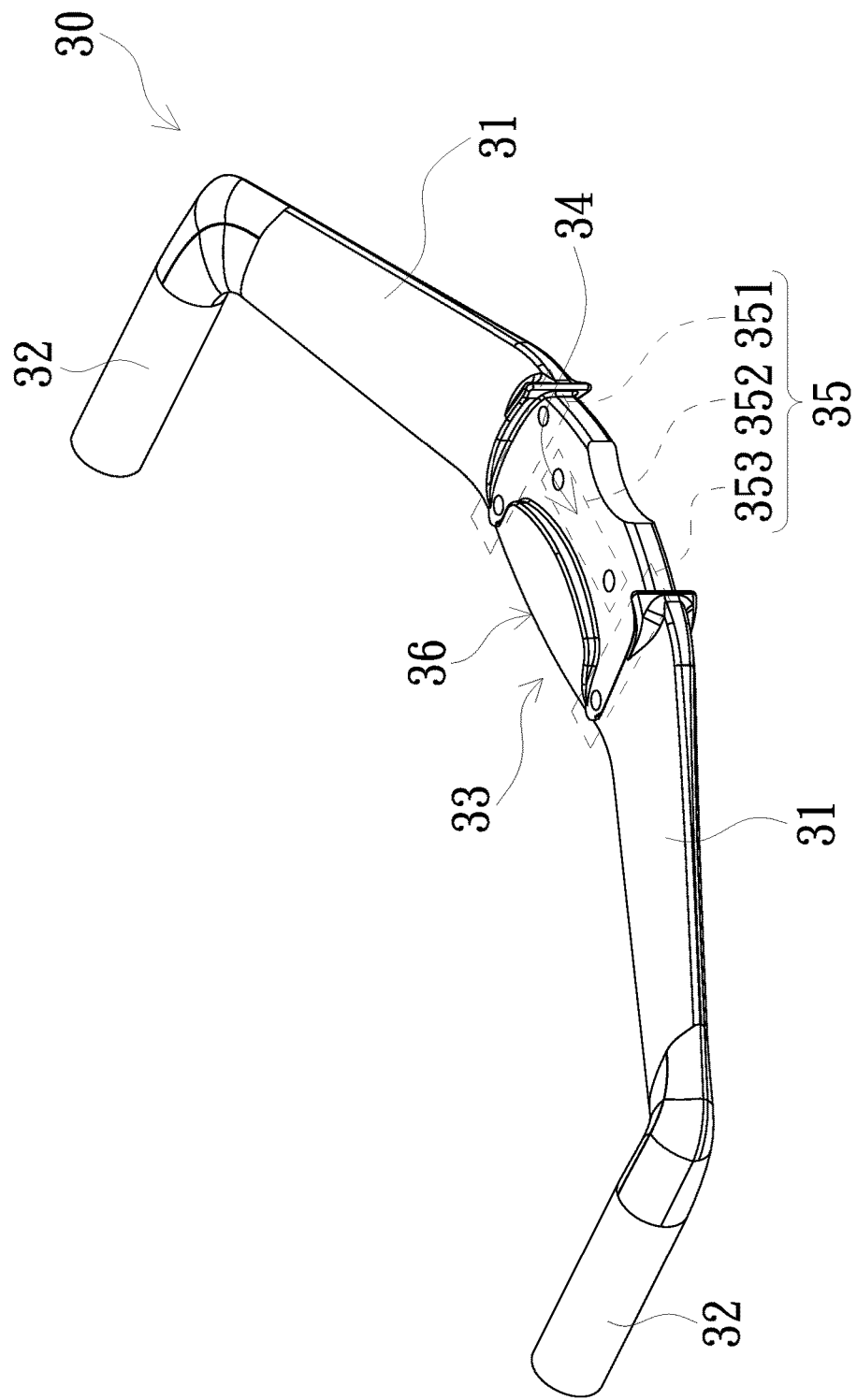
FIG. 1 is a schematic diagram of an embodiment of an embedded handle of the present disclosure.

The present disclosure relates to an embedded handle and a handle structure of the embedded handle for a bicycle. Referring to FIG. 1, the embedded handle 30 for a bicycle is one type of flat handlebar, bent handlebar or aero handlebar. Aero handlebars are described as the preferred embodiments of the present disclosure. As illustrated in FIG. 1, the embedded handle 30 includes grip portions 32 extending forwards of a bicycle. The embedded handle 30 further includes a grip bar 31. The grip bar 31 includes a joining portion 33. The joining portion 33 is disposed in a middle portion of the embedded handle 30. A depression 34 is formed in the joining portion 33. The depression 34 includes a connecting portion 35.

The grip bar 31 of the embedded handle 30 has a flat and wide shape to reduce wind resistance. The embedded handle 30 is joined to other element through the depression 34. The embedded handle 30 further includes a spoiler portion 36 disposed in a front edge of the joining portion 33 for stable riding at a high speed.

Figure 2:
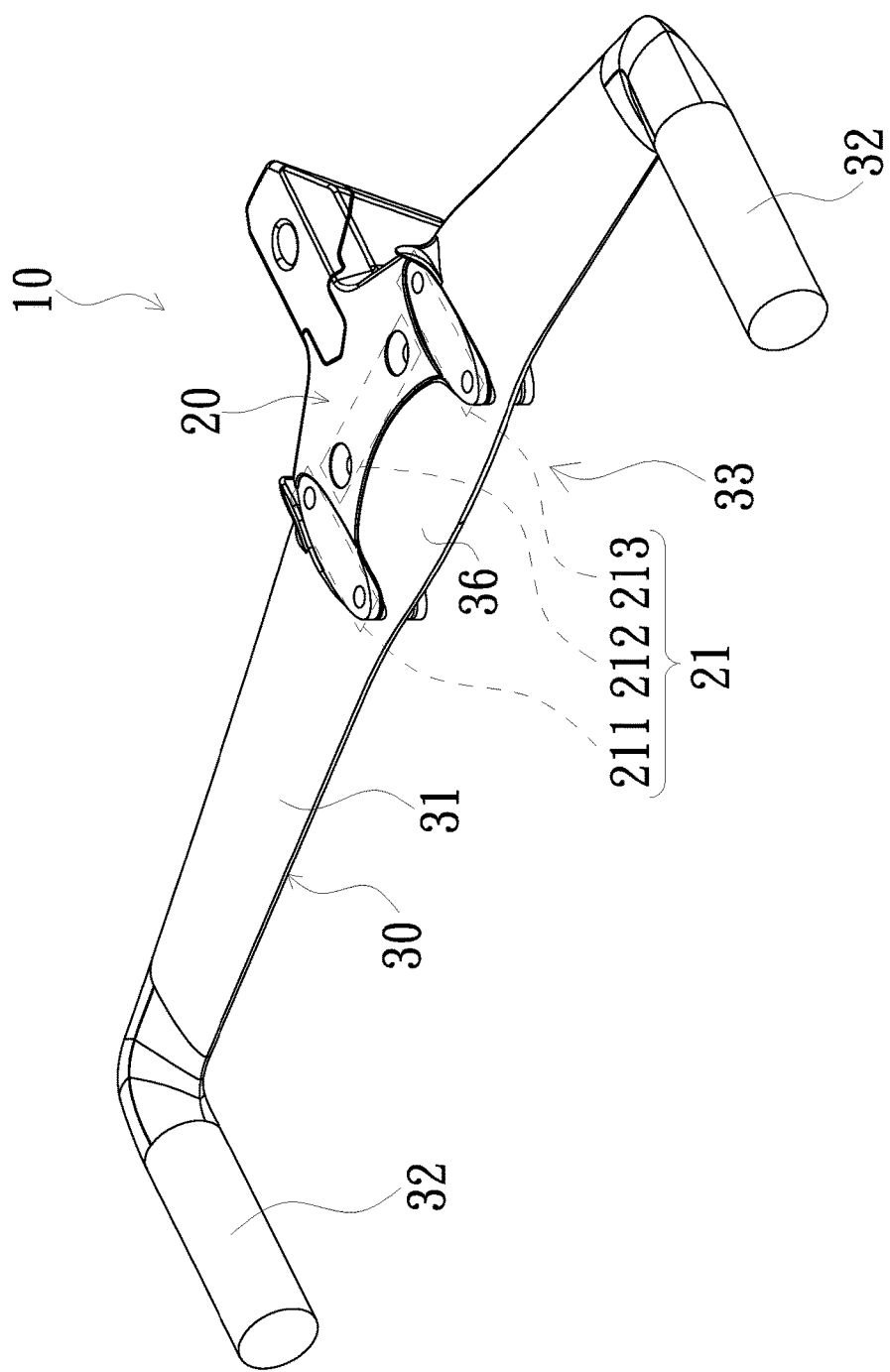
FIG. 2 is a schematic diagram of an embodiment of a handle structure of the present disclosure.
Figure 3:
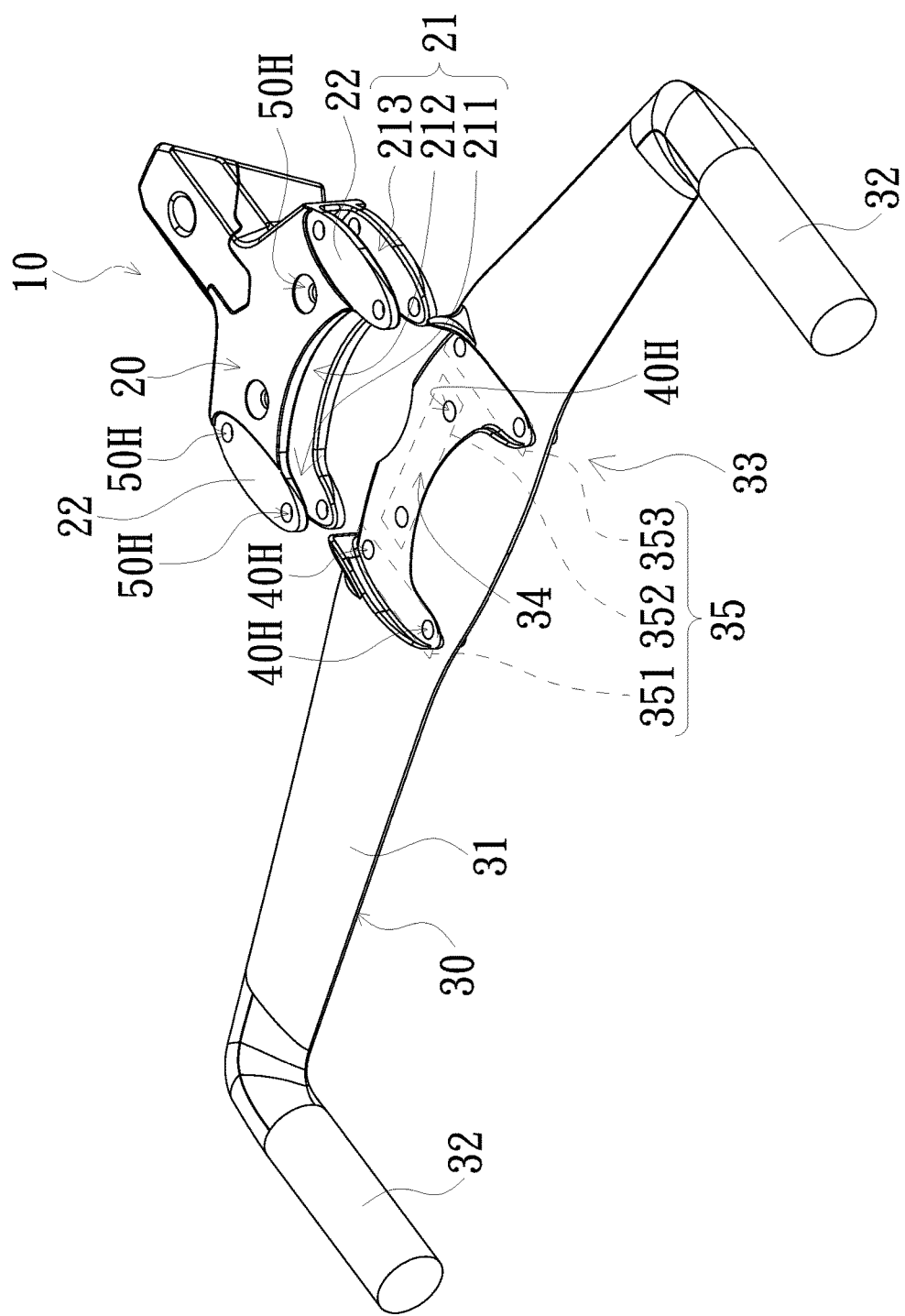
FIG. 3 is an exploded diagram of FIG. 2.

Referring to FIGS. 1 to 3, a handle structure 10 of the present disclosure is illustrated. The handle structure 10 of the present disclosure includes an embedded handle 30 and a stem 20.

As illustrated in FIG. 1, in this embodiment, the embedded handle 30 is an integrally formed grip bar 31. The grip portions 32 are disposed at two ends (the right end and the left end) of the grip bar 31. The grip bar 31 includes a joining portion 33. The joining portion 33 is disposed in a middle portion of the embedded handle 30. The depression 34 is formed in the joining portion 33 and extends forwards along the right side and the left side of the joining portion 33. The depression 34 includes the connecting portion 35.

As illustrated in FIG. 3, the stem 20 includes an engaging portion 21. The engaging portion 21 includes four joining mechanisms disposed on right and left side of an upper and a lower portion without any intersection. The engaging portion 21 engages with the depression 34 so that the connecting portion 35 is tightly fitted and engaged with the engaging portion 21 through their mated interfaces.

As illustrated in FIG. 3, the connecting portion 35 includes a first connecting part 351, a second connecting part 353 and a third connecting part 352. Each of the first connecting part 351, the second connecting part 353 and the third connecting part 352 includes at least one through hole 40H. The engaging portion 21 of the stem 20 includes a first engaging part 211, a second engaging part 213 and a third engaging part 212. Each of the first engaging part 211, the second engaging part 213 and the third engaging part 212 includes at least one screw hole 50H. At least one bolt extends through the through hole 40H of the connecting portions 351, 353 and 352 to screw into the screw hole 50H of the engaging portions 211, 213 and 212 so that the engaging portions 211, 213 and 212 are tightly joined to the connecting portions 351, 353 and 352.

In addition, each of the first engaging part 211 and the second engaging part 213 has a base 22. In this embodiment, two screw holes 50H are formed in the base 22 for connecting the handle structure to other elements.

Figure 4:
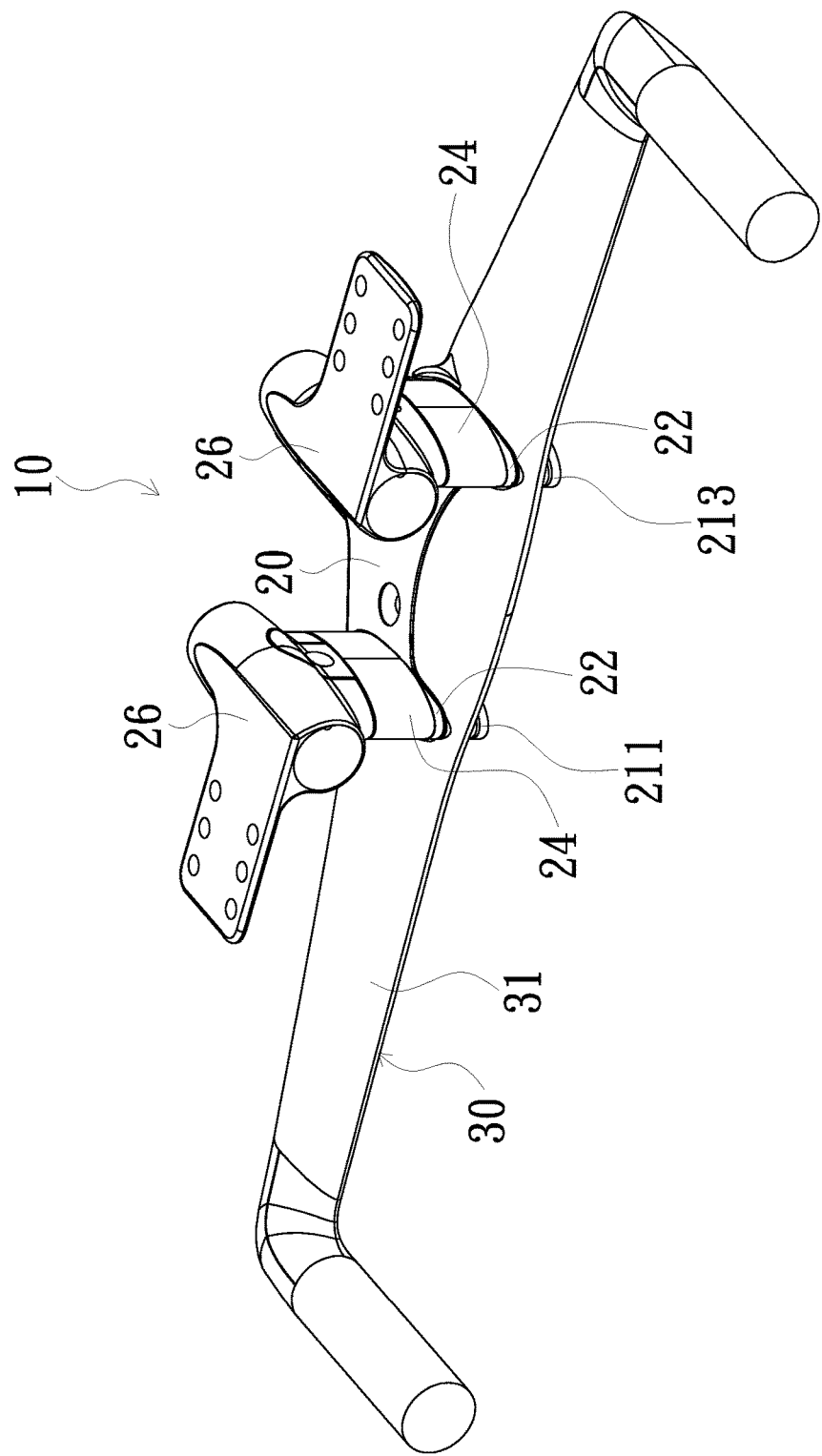
FIG. 4 is a schematic diagram of another embodiment of a handle structure of the present disclosure.

Referring to FIG. 4, another embodiment of the handle structure of the present disclosure is illustrated. The handle structure 10 of this embodiment further includes at least one spacer 24 and at least one extension bar seat 26. The base 22 of the stem 20 is engaged with the spacer 24 or the extension bar seat 26. Each spacer 24 has at least one screw hole corresponding to the screw holes 50H of the base 22, and each of the extension bar seat 26 has at least one screw hole corresponding to the screw hole of the spacer 24.

Therefore, as illustrated in FIG. 4, the extension bar seat 26 and the spacer 24 are stacked on the base 22, and bolts are inserted into the through holes 40H and screwed into the screw holes of the stem 20, the spacer 24 and the extension bar seat 26, whereby the extension bar seat 26, the spacer 24, the stem 20 and the grip bar 31 are firmly joined together to become a handle structure 10 with multiple functions. In another embodiment, the spacer 24 is eliminated, and the extension bar seat 26 is directly joined to the base 22. In another embodiment, one or more spacer 24 is added to adjust the height of the extension bar seat 26.

The grip bar 31 of the embedded handle 30 is inclined upwards and has a drop. The drop means the height difference between the middle portion of the stem 20 and the grip portion 32 of the embedded handle 30. The grip bars 31 of FIGS. 1-4 are inclined upward and thus have negative drops. The embedded handle 30 can be turned upside down and assembled to the stem 20 so that the grip bar 31 is inclined downwards and have a positive drop.

Figure 5:
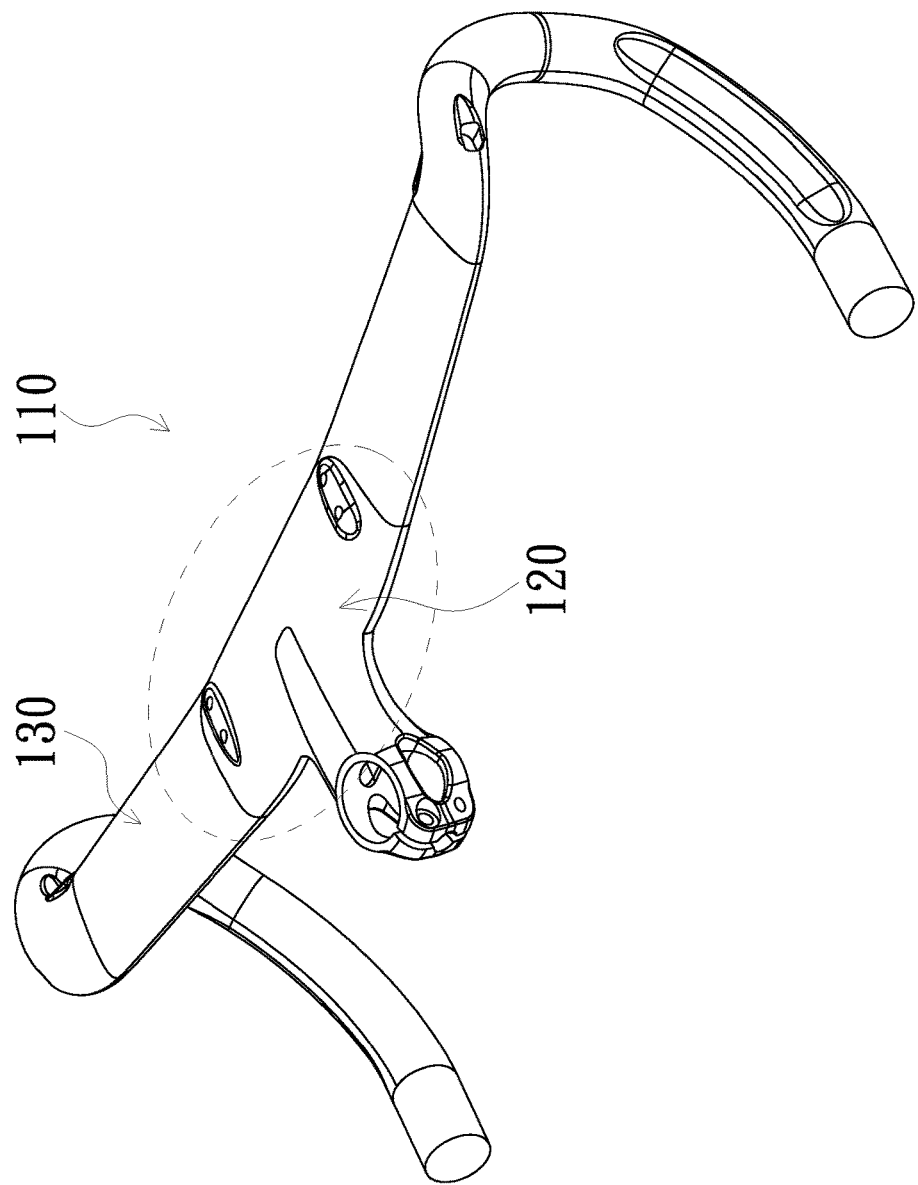
FIGS. 5, 5A and 5B are schematic diagrams of another embodiment of a handle structure of the present disclosure.
Figure 5A:
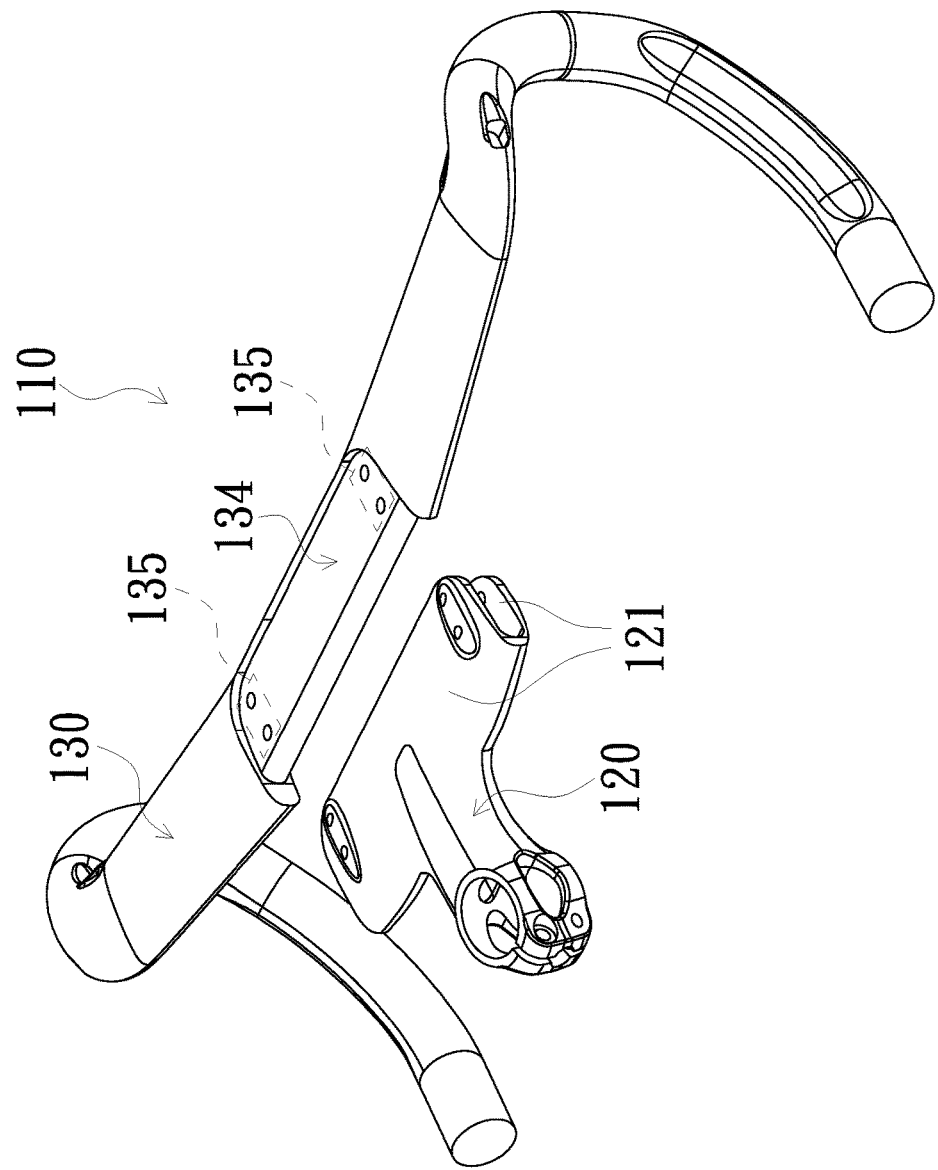
Figure 5B:
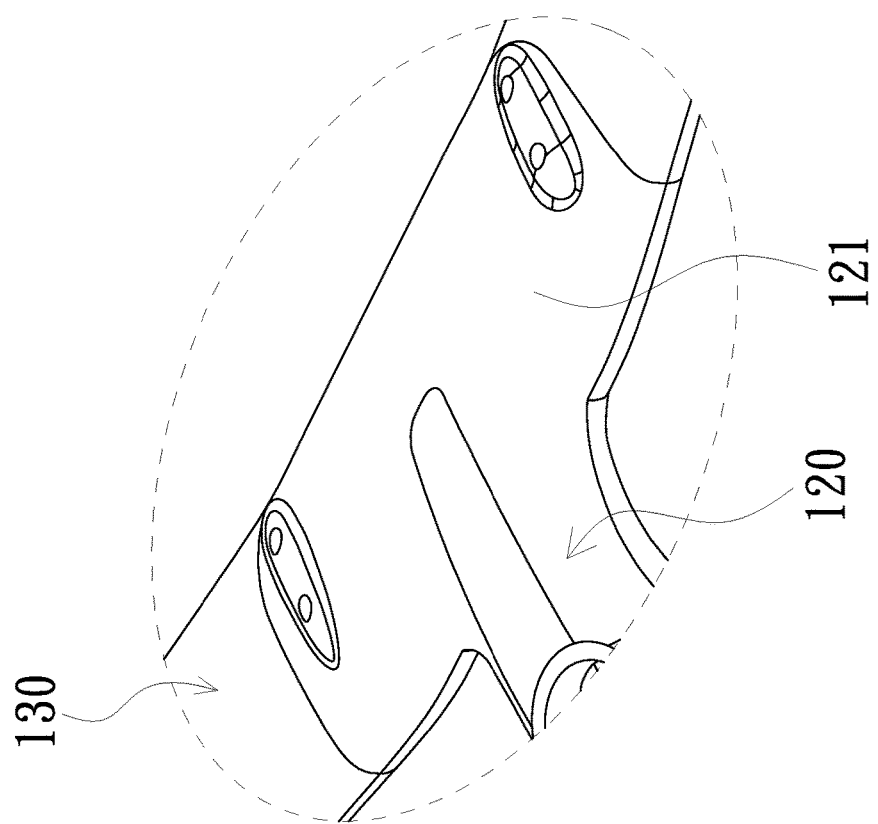

In addition, referring to FIGS. 5, 5A and 5B, another embodiment of a handle structure 110 is illustrated. The stem 120 includes an engaging portion 121, and the embedded handle 130 includes a depression 134. The depression 134 includes two connecting portions 135. The connecting portions 135 is tightly fitted and engaged with the engaging portion 121. As illustrated in FIGS. 5 and 5A, when the engaging portion 121 of the stem 120 engages the depression 134 of the embedded handle 130, an outer surface of the stem 120 and an outer surface of the embedded handle 130 are combined to form a smooth surface with low wind resistance so as to form an embedded handle structure 110 having smooth surface with low wind resistance.

Figure 6:
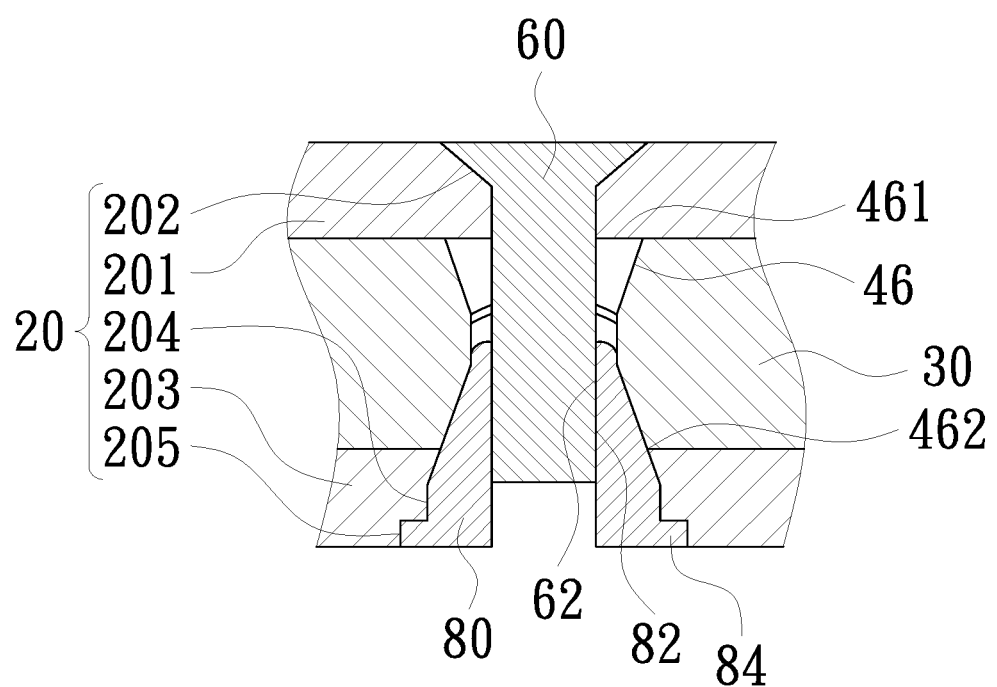
FIG. 6 is a cross section of an embodiment of a handle structure of the present disclosure.

Referring to FIG. 6, the handle structure 10 of the present disclosure further includes a first fastener 60 and a second fastener 80. The engaging portion 21 of stem 20 further includes a first mounting portion 201 and a second mounting portion 203. An accommodating space is formed between the first mounting portion 201 and the second mounting portion 203. The first mounting portion 201 has a first mounting hole 202, and the second mounting portion 203 has a second mounting hole 204. The connecting portion 35 of embedded handle 30 has a third mounting hole 46. When the embedded handle 30 is disposed in the accommodating space, the first mounting hole 202, the second mounting hole 204 and the third mounting hole 46 are aligned. The first fastener 60 is inserted into the stem 20 through the first mounting hole 202. The second fastener 80 is inserted into the embedded handle 30 through the second mounting hole 204 and the third mounting hole 46. The first fastener 60 is fastened to the second fastener 80 to join the stem 20 to the embedded handle 30. At least a portion of an inner peripheral wall of the third mounting hole 46 is conical, and at least a portion of an outer peripheral wall of the second fastener 80 is conical. The outer peripheral wall of the second fastener 80 is fitted to the inner peripheral wall of the third mounting hole 46 through their relative configurations. In this embodiment, preferably, the least a portion of an inner peripheral wall of the third mounting hole 46 is circular conical, and the at least a portion of an outer peripheral wall of the second fastener 80 is circular conical.

In this embodiment, the first fastener 60 is inserted into the aligned first mounting hole 202, second mounting hole 204 and handle mounting hole 46 via the first mounting hole 202 or the second mounting hole 204. The second fastener 80 is inserted into the aligned first mounting hole 202, second mounting hole 204 or handle mounting hole 46 in a direction opposite to the first fastener 60 and fastened to the first fastener 60. The first fastener 60 and the second fastener 80 extend through the first mounting hole 202 and the handle mounting hole 46 respectively and fasten in the handle mounting hole 46.

In this embodiment, the handle mounting hole 46 further includes a first opening 461 and a second opening 462. The first opening 461 is opposite to the second opening 462, and the inner peripheral wall of the handle mounting hole 46 has a diameter gradually reduced from the first opening 461 and the second opening 462 to the interior of the embedded handle 30 respectively to form a substantially symmetrical structure with respect to the first opening 461 and the second opening 462.

In this embodiment, the substantially symmetrical structure includes two connected circular conical surfaces. Therefore, the embedded handle 30 can be assembled to the stem 20 with both sides. The embedded handle 30 is inclined upwards, when the embedded handle 30 is assembled to the stem 20, the third mounting hole 46 is aligned with the second mounting hole 204 of the stem 20, and the first fastener 60 and the second fastener 80 is inserted into the first mounting hole 202, the second mounting hole 204 or the third mounting hole 46 to secure the stem 20 and the embedded handle 30. Besides, the embedded handle 30 can be turned upside down, so that the embedded handle 30 is inclined downwards to fit the divers' riding custom.

In this embodiment, a portion of the inner peripheral wall of the first mounting hole 202 is conical, and a portion of an outer peripheral wall of the first fastener 60 is conical. In this embodiment, a head portion of the first fastener 60 is conical. When the first fastener 60 is fastened to the second fastener 80, the outer peripheral wall of the first fastener 60 abuts to the inner peripheral wall of the first mounting hole 202. In this embodiment, preferably, a portion of the inner peripheral wall of the first mounting hole 202 is circular conical, and a portion of an outer peripheral wall of the first fastener 60 is circular conical and abuts to the inner peripheral wall of the first mounting hole 202 through their relative configurations.

In this embodiment, the first fastener 60 is a bolt, and the second fastener 80 is a nut. A male screw thread 62 is formed on the outer peripheral wall of the first fastener 60. The second fastener 80 has an inner peripheral wall, and a female screw thread 82 is formed on the inner peripheral wall of the second fastener 80. The first fastener 60 is fastened to the second fastener 80 through engagement of the male screw thread 62 and the female screw thread 82.

In addition, the second fastener 80 has a flange 84, and the second mounting portion 203 has a counter bore 205. When the second fastener 80 is inserted into the handle mounting hole 46 and the second mounting hole 204, the flange 84 engages the counter bore 205 so as to limit the second fastener 80. When the first fastener 60 is fastened to the second fastener 80, engagement of the flange 84 and the counter bore 205 provides a stable fastening structure.

Because the inner peripheral wall of the handle mounting hole 46 is conical, and the outer peripheral wall of the second fastener 80 is also conical, when the first fastener 60 is fastened to the second fastener 80, the outer peripheral wall of the second fastener 80 abuts to the inner peripheral wall of the handle mounting hole 46, whereby the handle structure has a larger lateral fastening strength and can sustain a larger shear stress so as to avoid damage of the first fastener 60 and the second fastener 80 due to shear stress caused by structural compression. The second fastener 80 provides a larger engaging area so as to increase stability of the whole structure. Since the inner peripheral wall of the handle mounting hole 46 is conical, the opening of the handle mounting hole 46 has a larger diameter and the second fastener 80 is easily inserted into the handle mounting hole 46 so as to simplify manufacturing process and reduce manufacturing cost.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A handle set for a bicycle, comprising:
a stem comprising an engaging portion, the engaging portion comprising a first engaging part, a second engaging part, and a third engaging part;
an embedded handle, comprising:
two grip portions; and
a joining portion connecting the two grip portions;
wherein each of the first engaging part and the second engaging part has a respective spacer mounted thereon, and a respective extension bar seat mounted on each respective spacer;
wherein the third engaging part has a first mounting portion and a second mounting portion, the first mounting portion having a first mounting hole and the second mounting portion having a second mounting hole;

wherein the embedded handle has a handle mounting hole disposed between, and aligned with, the first mounting hole and the second mounting hole;

a first fastener and a second fastener inserted into the aligned first mounting hole, second mounting hole, and handle mounting hole.

2. The handle set according to claim 1, wherein the embedded handle further comprises a spoiler portion disposed in the joining portion and opposite to the stem.

3. The handle set according to claim 1, further comprising: the first fastener is inserted into the first mounting hole along a direction from the first mounting hole to the second mounting hole, the second fastener is inserted into the second mounting hole along a direction from the second mounting hole to the first mounting hole, an outer peripheral wall of the second fastener is fitted to an inner peripheral wall of the handle mounting hole; wherein the inner peripheral wall of the handle mounting hole is tapered from an outer surface to an interior of the embedded handle.

4. The handle set according to claim 3, wherein the first fastener is a bolt, and the second fastener is a nut.

5. The handle set according to claim 3, wherein the handle mounting hole further comprises a first opening and a second opening.

6. The handle set according to claim 5, wherein the first opening is opposite to the second opening, and the inner peripheral wall of the handle mounting hole has a diameter gradually reduced from the first opening and the second opening to the interior of the embedded handle respectively to form a substantially symmetrical structure with respect to the first opening and the second opening.

7. The handle set according to claim 6, wherein the substantially symmetrical structure comprises two connected conical surfaces.

8. The handle set according to claim 6, wherein the embedded handle has an asymmetrical structure with respect to a horizontal line, and the embedded handle is configured to be engage with the stem in two different vertical arrangements.

9. The handle set according to claim 3, wherein at least one portion of an inner peripheral wall of the first mounting hole is conical, at least one portion of an outer peripheral wall of the first fastener is conical, and the inner peripheral wall of the first mounting hole is fitted to the outer peripheral wall of the first fastener through corresponding conical configurations of the inner peripheral wall of the first mounting hole and the outer peripheral wall of the first fastener.

10. The handle set according to claim 9, wherein the inner peripheral wall of the first mounting hole is circular conical, and the outer peripheral wall of the first fastener is circular conical.

11. The handle set according to claim 3, wherein at least a portion of an inner peripheral wall of the second mounting hole is conical, at least a portion of an outer peripheral wall of the second fastener is conical, and the inner peripheral wall of the second mounting hole is fitted to the outer peripheral wall of the second fastener through corresponding conical configurations of the inner peripheral wall of the second mounting hole and the outer peripheral wall of the second fastener.

12. The handle set according to claim 3, wherein a counter bore is formed at an opening of the second mounting hole, the second fastener comprises a flange, and the flange is configured to engage the counter bore.

* * * * *